United States Patent [19]
Houlihan

[11] 3,920,646
[45] Nov. 18, 1975

[54] 3-SUBSTITUTED-1-PYRIDYL-1,4,5,6-TETRAHYDROPYRIDAZINES

[75] Inventor: William J. Houlihan, Mountain Lakes, N.J.

[73] Assignee: Sandoz, Inc., E. Hanover, N.J.

[22] Filed: Jan. 13, 1971

[21] Appl. No.: 106,249

Related U.S. Application Data

[63] Continuation-in-part of Ser. No. 680,002, Nov. 2, 1967, Pat. No. 3,586,681, which is a continuation-in-part of Ser. No. 566,719, July 21, 1966, abandoned.

[52] U.S. Cl.............................. 260/250 A; 424/250
[51] Int. Cl.². ....................................... C07D 241/02
[58] Field of Search..................................... 260/250

[56] References Cited
UNITED STATES PATENTS

| | | | |
|---|---|---|---|
| 3,198,801 | 8/1965 | Carabateas | 260/250 A |
| 3,542,777 | 11/1970 | Francis | 260/250 A |
| 3,586,681 | 6/1971 | Houlihan | 260/250 A |

*Primary Examiner*—Nicholas S. Rizzo
*Attorney, Agent, or Firm*—Gerald D. Sharkin; Robert S. Honor; Thomas O. McGovern

[57] ABSTRACT

3-Substituted-1-pyridyl-1,4,5,6-tetrahydropyridazines are prepared by reducing the corresponding 6-substituted-2-pyridyl-substituted-4,5-dihydro-3(2H)-pyridazinone intermediates, and both the compounds and intermediates are useful as anti-inflammatory agents.

2 Claims, No Drawings

3-SUBSTITUTED-1-PYRIDYL-1,4,5,6-TETRAHYDROPYRIDAZINES

This application is a continuation-in-part of application Ser. No. 680,002, filed Nov. 2, 1967, which issued as U.S. Pat. No. 3,586,681 on June 22, 1971, which in turn is a continuation-in-part of application Ser. No. 566,719, filed July 21, 1966, now abandoned.

This invention relates to 1-pyridyl-1,4,5,6-tetrahydropyridazine derivatives. In particular, this invention pertains to certain 3-substituted-1-pyridyl-1,4,5,6-tetrahydropyridazines and their acid addition salts, intermediates in the preparation thereof and processes for the preparation of such compounds. This invention also relates to pharmaceutical compositions containing the said above compounds and the therapeutic use of such pharmaceutical compositions.

The compounds contemplated by the present invention have the following structure:

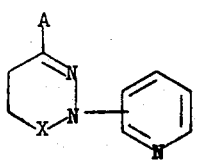   I wherein
X is —CH$_2$— or >C=O,
and
A is phenyl having from one to two substituents, pyridyl, thienyl or furyl,
each of said phenyl substituents being, independently, halogen having an atomic weight of from 19 to 36, trifluoromethyl, lower alkyl or lower alkoxy, and pharmaceutically acceptable acid addition salts thereof.

With respect to the above-mentioned phenyl substituents, preferred lower alkyl substituents are straight chain alkyl having from one to four carbon atoms, e.g., methyl, ethyl, n-propyl and n-butyl; preferred alkoxy substituents are straight chain alkoxy having one to four carbon atoms, e.g., methoxy, ethoxy, n-propoxy and n-butoxy, and the halogen substituents include fluorine and chlorine.

Representative substituted phenyl functions suitable as -A include p-methoxyphenyl, p-chlorophenyl, 3,4-dichlorophenyl, p-fluorophenyl and p-tolyl.

Pyridyl, thienyl and furyl functions suitable as -A include 2-, 3- and 4-pyridyl, 2- and 3-thienyl and 2- and 3-furyl.

Compounds of formula I in which X is —CH$_2$— (I$a$) are obtained by reduction of the corresponding carbonyl-containing intermediates, i.e., 6-substituted-2-pyridyl-4,5-dihydro-3(2H)-pyridazinones of formula I$b$

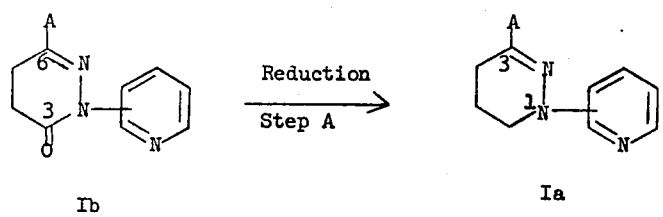

in which A is as defined above.

The reduction of a compound of formula I$b$ to its corresponding compound of formula I$a$ may be effected by conventional means for reducing a carbonyl to a methylene (Step A), e.g., by the use of lithium aluminum hydride (LAH) in an inert solvent, such as tetrahydrofuran (THF), diethyl ether or dibutyl ether at temperatures of from about 20° to 150°C., preferably at reflux temperatures, and in a nitrogen atmosphere. It is also preferred to use the reducing agent in a ratio of from 1.0 to 1.8 equivalents per equivalent of the compound of formula I$b$.

The compounds of formula I$b$ may be prepared by condensation (Step B) of a suitable γ-ketobutyric acid, i.e., a compound of formula II

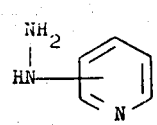   II in which A is as defined above, with a hydrazine of formula III

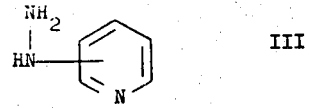   III

The condensation (Step B) may be carried out in a conventional manner. For example, the condensation may be carried out by heating an intimate mixture of a compound of formula II and a compound of formula III, preferably in an inert solvent, e.g., toluene, preferably in the presence of an acid-acting catalyst, such as an arylsulfonic acid, e.g., para-toluene sulfonic acid monohydrate, and at temperatures of from about 60° to 150°, preferably at reflux temperatures. It is preferred to remove water formed in the reaction, for example, by selecting a solvent which forms an azeotrope with water but is water immiscible, thus permitting use of a Dean-Stark tube to remove water from the reaction system. While compounds of formula II, theoretically, react with compounds of formula III in a molar ratio of 1:1 to form the corresponding compound of formula I$b$, it is preferred to carry out this condensation reaction using an excess of the compound of formula III, e.g., using from 10 to 100 mole % excess of the compound of formula III.

The compounds of formulae II and III are either known and can be prepared as described in the literature or can be prepared from known starting materials in analogous manner to that described in the literature for the preparation of known compounds.

The relationship of the above-mentioned reactions may be conveniently illustrated as follows:

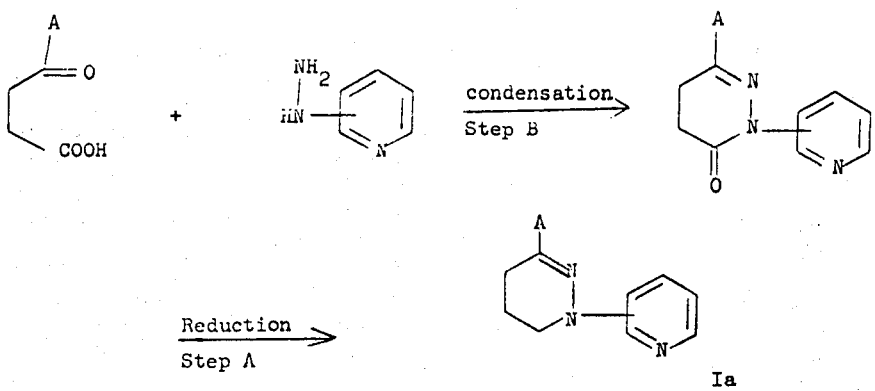

The compounds of formula I are useful because they possess pharmacological activity in animals. In particular, the compounds of formula Ia as well as those compounds of formula Ib are useful as antiinflammatory agents, as indicated by the carrageenan-induced edema test on the white rat paw. For such use the compounds may be admixed with conventional pharmaceutical carriers or diluents and administered internally (orally or parenterally) in the form of tablets, capsules, elixirs, solutions or suspensions. Furthermore, the compounds of formulas Ia and Ib may also be administered in the form of their nontoxic pharamaceutically acceptable acid addition salts.

Such salts possess the same order of activity of the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

For the treatment of inflammation, the therapeutically effective dose will, of course, vary depending upon the compound employed, mode of administration and treatment desired. However, in general, satisfactory results are obtained when administered at a daily dosage of from about 10 milligrams per kilogram of body weight to about 100 milligrams per kilogram of body weight preferably given in divided doses two to six times a day or in sustained release form. For larger mammals in need of said treatment as well as the smaller domestic mammals, total daily dosage is generally from about 200 milligrams to about 3,000 milligrams, and dosage forms suitable for internal administration comprise from about 35 milligrams to about 500 milligrams of the compound admixed with a solid or liquid pharmaceutical carrier or diluent.

Pharmaceutical compositions containing said compounds may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, steric acid and talc. The tablets may be uncoated or coated by known techniques to delay disintegration and absorption in the gastrointestinal tract, if desired. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin.

The preferred pharmaceutical compositions from the standpoint of preparation and ease of administration are solid compositions, particularly hard-filled capsules and tablets containing from about 100 milligrams to about 500 milligrams of the active ingredient.

The following examples serve to further illustrate the present invention. However, it is to be understood that the examples are for purposes of illustration only and are not intended as in any way limiting the scope of the invention which is defined in the appended claims. Furthermore, it is to be understood that the active ingredient used in Examples 3 and 4 can be replaced by any of the other compounds described hereinabove and there are likewise obtained pharmaceutical compositions suitable for the treatment of inflammations.

EXAMPLE 1

6-(p-chlorophenyl)-2-(α-pyridyl)-4,5-dihydro-3(2H)-pryidazinone

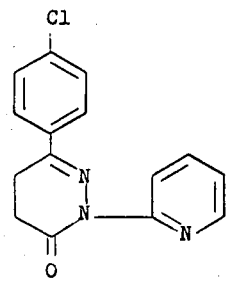

To a flask equipped with a heater, a stirrer and a reflux condenser fitted with a Dean-Stark tube is charged 63.7 g. (0.30 mole) of 3-(p-chlorobenzoyl)propionic acid, 49.0 g. (0.45 mole) of 2-hydrazinopyridazine, 1.0 g. of p-toluene sulfonic acid monohydrate and 600 ml. of toluene. The mixture in the flask is stirred, heated to maintain refluxing and water is continuously removed from the system. After formation of water of reaction ceases the reaction mixture is allowed to cool, removed from the flask and the toluene substantially removed under vacuum in a rotary evaporator to obtain residue. The residue is crystallized from methanol-water (1:1) to obtain 6-(p-chlorophenyl)-2-(α-pyridyl)-4,5-dihydro-3(2H)-pyridazinone; m.p. 118° to 119°C.

Following the above procedure but using an equivalent amount of 3-(p-toluoyl)propionic acid, 3-(p-trifluoromethylbenzoyl)propionic acid, 3-(p-methoxybenzoyl)propionic acid, 3-(3,4-dichlorobenzoyl)propionic acid, 3-(p-fluorobenzoyl)propionic acid, 3-(2-thenoyl)-propionic acid, 3-(2-furoyl)-propionic acid or 3-picolinoyl-propionic acid in place of the 3-(p-chlorobenzoyl)propionic acid used therein, there is obtained 6-(p-tolyl)-2-(α-pyridyl)-4,5-dihydro-3(2H)-pyridazinone, 6-(p-trifluoromethylphenyl)-2-(α-pyridyl)-4,5-dihydro-3(2H)-pyridazinone, 6-(p-methoxyphenyl)-2-(α-pyridyl)-4,5-dihydro-3(2H)-pyridazinone, 6-(3,4-dichlorophenyl)-2-(α-pyridyl)-4,5-dihydro-3(2H)-pyridazinone, 6-(p-fluorobenzyl)-2-(α-pyridyl)-4,5-dihydro-3(2H)-pyridazinone, 6-(2-thienyl)-2-(α-pyridyl)-4,5-dihydro-3(2H)-pyridazinone, 6-(2-furyl)-2-(α-pyridyl)-4,5-dihydro-3(2H)-pyridazinone or 2,6-di-(α-pyridyl)-4,5-dihydro-3(2H)-pyridazinone, respectively.

EXAMPLE 2

3-(p-chlorophenyl)-1-(α-pyridyl)-1,4,5,6-tetrahydropyridazine

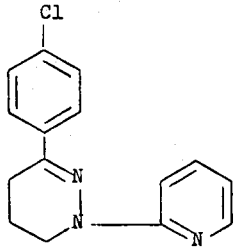

To a flask equipped with a heater, a stirrer, a reflux condenser and an addition funnel is charged 2.38 g. (0.063 mole) of lithium aluminum hydride and 200 ml. anhydrous diethyl ether. The system is blanketed with dry nitrogen gas and a solution of 14.3 g. (0.05 mole) of 6-(p-chlorophenyl)-2-(α-pyridyl)-4,5-dihydro-3(2H)pyridazinone (obtained as described in Example 1) in 500 ml. of anhydrous diethyl ether and 125 ml. of anhydrous tetrahydrofuran is added dropwise, with stirring, over a period of 0.5 hour. The resulting mixture is refluxed for 15 hours, then cooled in an ice bath. To the cooled mixture is added first dropwise 4.8 ml. of 2N sodium hydroxide with 6.9 ml. of water and then 15 g. of anhydrous sodium sulfate. The solids are removed from the mixture by filtration, and the filtrate is then evaporated under vacuum in a rotary-evaporator to obtain a residue. The oily residue is then dissolved in 200 ml. of anhydrous diethyl ether, and the solution is then saturated with anhydrous hydrogen chloride, at 20°C., to precipitate 3-(p-chlorophenyl)-1-(α-pyridyl)-1,4,5,6-tetrahydropyridazine as a monohydrochloride salt. The salt recrystallizes from isopropanol-tetrahydrofuran-ethyl acetate (2:1:1) and melts with decomposition at above 85°C.

When an equivalent amount of 6-(p-tolyl)-2-(α-pyridyl)-4,5-dihydro-3(2H)-pyridazinone, 6-(p-trifluoromethylphenyl)-2-(α-pyridyl)-4,5-dihydro-3(2H)-pyridazinone, 6-(p-methoxyphenyl)-2-(α-pyridyl)-4,5-dihydro-3(2H)-pyridazinone, 6-(3,4-dichlorophenyl)-2-(α-pyridyl)-4,5-dihydro-3(2H)-pyridazinone, 6-(p-fluorophenyl)-2-(α-pyridyl)-4,5-dihydro-3(2H)-pyridazinone, 6-(2-thienyl)-2-(α-pyridyl)-4,5-dihydro-3(2H)-pyridazinone, 6-(2-furyl)-2-(α-pryidyl)-4,5-dihydro-3(2H)-pyridazinone or 2,6-di-(α-pyridyl)-4,5-dihydro-3(2H)-pyridazinone is used in place of the 6-(p-chlorophenyl)-2-(α-pyridyl)-4,5-dihydro-3(2H)-pyridazinone in the above process there is obtained 3-(p-tolyl)-1-(α-pyridyl)-1,4,5,6-tetrahydropyridazine, 3-(p-trifluoromethylphenyl)-1-(α-pyridyl)-1,4,5,6-tetrahydropyridazine, 3-(p-methoxyphenyl)-1-(α-pyridyl)-1,4,5,6-tetrahydropyridazine, 3-(3,4-dichlorophenyl)-1-(α-pyridyl)-1,4,5,6-tetrahydropyridazine, 3-(p-fluorophenyl)-1-(α-pyridyl)-1,4,5,6-tetrahydropyridazine, 3-(2-thienyl)-1-(α-pyridyl)-1,4,5,6-tetrahydropyridazine, 3-(2-furyl)-1-(α-pyridyl)-1,4,5,6-tetrahydropyridazine or 1,3-di-(α-pyridyl)-1,4,5,6-tetrahydropyridazine, respectively.

EXAMPLE 3

Tablets

Tablets suitable for oral administration and containing the following ingredients are prepared by conventional tabletting techniques.

| Ingredients | Weight (mg.) |
| --- | --- |
| 3-(p-chlorophenyl)-1-(α-pyridyl)-1,4,5,6-tetrahydropyridazine | 250 |
| tragacanth | 10 |
| lactose | 197.5 |
| corn starch | 25 |
| talcum | 15 |
| magnesium stearate | 2.5 |

The tablets so prepared are useful in the treatment of inflammations at a dose of one tablet, two to six times a day, i.e., 500 to 1,500 mg. per diem.

EXAMPLE 4

Dry Filled Capsules

Capsules suitable for oral administration containing the following ingredients are prepared in conventional manner.

| Ingredients | Weight (mg.) |
| --- | --- |
| 3-(p-chlorophenyl)-1-(α-pyridyl)-1,4,5,6-tetrahydropyridazine | 500 |
| inert solid diluent (starch, lactose or kaolin) | 500 |

The capsules so prepared are useful in the treatment of inflammations at a dose of one capsule, one to three times a day, i.e., 500 to 1,500 mg. per diem.

What is claimed is:

1. The compound which is 3-(p-chlorophenyl)-1-(α-pyridyl)-1,4,5,6-tetrahydropyridazine.

2. The compound which is 6-(p-chlorophenyl)-2-(α-pyridyl)-4,5-dihydro-3(2H)-pyridazinone.

* * * * *